J. E. MOORE.
PLUMB RULE AND LEVEL.
APPLICATION FILED SEPT. 25, 1914.

1,146,087.

Patented July 13, 1915.

Witnesses
Frederick H Taylor
J W Garner

Inventor
J. E. Moore.
By Victor J. Evans
Attorney

UNITED STATES PATENT OFFICE.

JOHN E. MOORE, OF MOUNT VERNON, ILLINOIS.

PLUMB-RULE AND LEVEL.

1,146,087.	Specification of Letters Patent.	Patented July 13, 1915.

Application filed September 25, 1914. Serial No. 863,534.

*To all whom it may concern:*

Be it known that I, JOHN E. MOORE, a citizen of the United States, residing at Mount Vernon, in the county of Jefferson and State of Illinois, have invented new and useful Improvements in Plumb-Rules and Levels, of which the following is a specification.

This invention is an improved plumb rule and level and consists in the construction, combination and arrangement of devices hereinafter described and claimed.

The object of this invention is to provide an improved device of this character in which readings may be taken from either side of the level and which level is adapted to be used with either of its edges or ends up.

A specific object of the invention is to combine with a frame or bar a dial plate which is adapted to be arranged therein, a point for use in connection with the protractor scale on the dial plate and novel means carried by the dial plate for supporting and forming the bearings for the arbor of the pointer.

Figure 1:
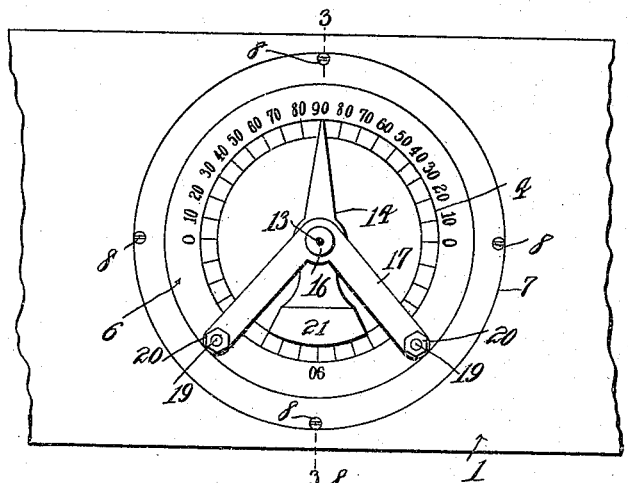
Figure 2:
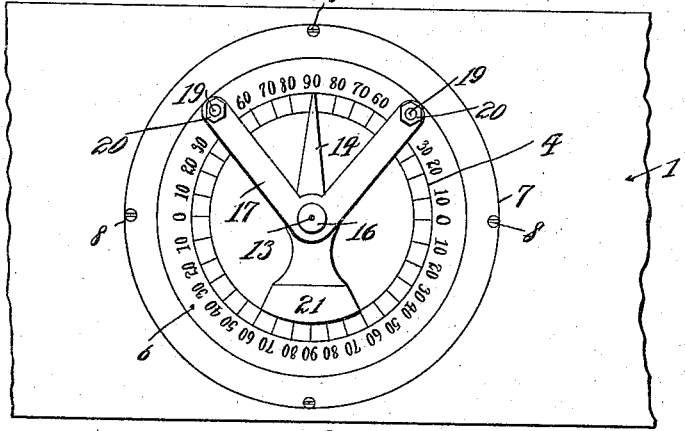
Figure 3:
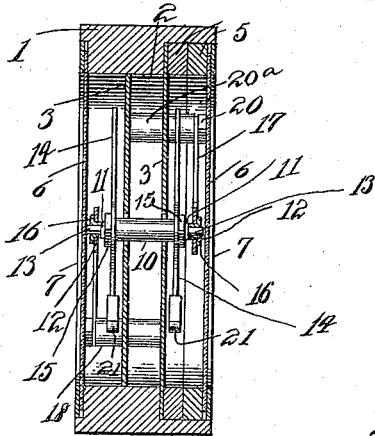

In the accompanying drawings:—Figure 1 is a side elevation of a central portion of a level constructed in accordance with my invention. Fig. 2 is a similar view showing the other side thereof. Fig. 3 is a vertical central sectional view of the same taken on the line 3—3 of Fig. 1.

The bar or frame 1 is provided with a central opening 2 which extends transversely therethrough. In accordance with my invention I provide a pair of circular dial plates 3 which are arranged in spaced relation near the center of said opening and are provided on their outer sides with protractor scales 4. One of said dial plates is held against an annular shoulder in the opening 2 by clamping and spacer rings 5 which are fitted in the enlarged portion of said opening. The dial plates are connected together in spaced relation by two pairs of bolts 20. Two of these bolts are attached to each dial plate and passed through openings in the other. Spacer sleeves 20ª are placed on said bolts and arranged between the dial plates, and each of said bolts has a spacer sleeve 18 near its outer end and on the outer side of one of the dial plates. Brackets 17 are secured in place by said bolts, spacer sleeves and by means of clamping nuts 19 with which said bolts are provided, the said brackets being reversely arranged and each being spaced from the outer side of one of the dial plates.

The brackets are provided with bearings 16. An arbor 10 passes through central openings in the dial plates and is provided at its ends with reduced portions 11, providing shoulders 12, and at the outer ends of said reduced portions are spindles 13. Pointers 14 are secured on the reduced portions 11 between the shoulders 12 and clamping nuts 15. Said clamping nuts are screwed on said reduced portions, and the spindles 13 of said arbor are mounted in said bearings 16. The pointers are provided with weights 21 which keep them always vertical and cause them to coact with the protractor scales to indicate the position of the level and hence adapt it for use for leveling work or for arranging work at any desired angle.

Panes 6 are secured at opposite sides of the opening 2 by ring frames 7 which are secured to opposite sides of the bar 1 by screws 8. These screws also secure the rings 15 and the dial plate engaged by said rings, and hence both of the dial plates are prevented from turning. The panes may be made of mica or other suitable material.

Having thus described my invention, I claim:—

In a level, a bar having an opening extending transversely therethrough, a pair of dial plates arranged in spaced relation and in said opening, brackets arranged in spaced relation to the outer sides of said dial plates, securing means for the dial plates and said brackets and connecting the dial plates and brackets together, an arbor mounted in bearings in the brackets and passing through central openings in the dial plates, and weighted pointers carried by said arbor and coacting with the respective dial plates.

In testimony whereof I affix my signature in presence of two witnesses.

JOHN E. MOORE.

Witnesses:
GEO. C. MAGORIS,
GEORG T. HILL.

Copies of this patent may be obtained for five cents each, by addressing the "Commissioner of Patents, Washington, D. C."